United States Patent Office 2,729,689
Patented Jan. 3, 1956

2,729,689

PRODUCTION OF CARBIDE PRODUCT AND METHYLACETYLENE

Edward R. Blanchard, Summit, N. J., and Francis E. McKenna, New York, N. Y., assignors to Air Reduction Company, Incorporated, New York, N. Y., a corporation of New York No Drawing. Application May 27, 1952,
Serial No. 290,319

8 Claims. (Cl. 260—678)

This invention relates to a novel process for producing magnesium sesquicarbide ($Mg_2C_3$) and to a novel product containing the same. The novel magnesium sesquicarbide product exhibits a partially sintered but non-fused appearance and generates high yields of methylacetylene when subjected to hydrolysis or alcoholysis.

It has already been proposed to produce a magnesium sesquicarbide-containing melt by reacting calcium carbide with magnesium chloride in the liquid state, the magnesium chloride being in a molten eutectic mixture with sodium chloride or potassium chloride. Because the melting point of magnesium chloride (708° C.) is above the optimum conversion temperature for forming magnesium sesquicarbide, the eutectic mixture of magnesium chloride and sodium chloride is used as the reaction medium since it melts at about 435° C. Calcium carbide is added to the fused salts and the temperature is raised to the preferred conversion range. But the maximum solubility of calcium carbide in the fused salts is only about 10% to 15%. There is thus required large quantities of expensive magnesium chloride together with such foreign materials as sodium chloride and potassium chloride. Furthermore, the magnesium sesquicarbide product when treated with water gave only low yields of methylacetylene which indicates that only small amounts of calcium carbide had reacted to form magnesium sesquicarbide.

According to the present invention, it has been found that a novel magnesium sesquicarbide product can be obtained by reacting a mixture of calcium carbide, either crude commercial or purified, and substantially anhydrous magnesium chloride both being in the solid state, at a temperature at least sufficient for the formation of magnesium sesquicarbide, but below that which causes any substantial melting of the magnesium chloride and any substantial decomposition of magnesium sesquicarbide. In general, the temperature is maintained within the range of 500° C. to 700° C., a preferred range being about 575–650° C. It is advantageous that the calcium carbide and magnesium chloride are in a finely divided solid state and in intimate contact when reacted. A unique feature of this invention is that both the calcium carbide and the magnesium chloride are maintained in the solid state throughout the reaction.

When the magnesium sesquicarbide product thus obtained is subjected to hydrolysis or alcoholysis with, for example, a hydroxyl-containing compound, for instance water or a lower aliphatic alcohol, large quantities of methyl-acetylene are generated. Water is the preferred agent for conversion of the magnesium sesquicarbide product, although as hereinabove pointed out, other suitable hydroxyl-containing compounds may be employed, for example, lower aliphatic alcohols, such as methyl alcohol, ethyl alcohol, isopropyl alcohol and the like, or solutions of such alcohols in water. Other agents capable of generating methylacetylene from the magnesium sesquicarbide product may be also employed. Thus, acidic solutions such as dilute solutions of sulfuric or hydrochloric acid may also be employed for treating the magnesium sesquicarbide product to generate methylacetylene therefrom.

It is believed that the reactions which occur in the novel process can be represented by the following equations:

(1) 
$$2CaC_2 + 2MgCl_2 \rightarrow 2MgC_2 + 2CaCl_2$$
(2) 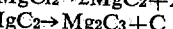
$$2MgC_2 \rightarrow Mg_2C_3 + C$$
(3) 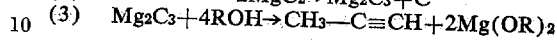
$$Mg_2C_3 + 4ROH \rightarrow CH_3-C\equiv CH + 2Mg(OR)_2$$

wherein R stands for H or a lower alkyl radical. When two molecules of water are employed in the hydrolysis, the reaction can be represented by the following equation:

(4) 
$$Mg_2C_3 + 2HOH \rightarrow CH_3-C\equiv CH + 2MgO$$

The formation of the magnesium sesquicarbide may occur as expressed by the sum of Equations 1 and 2 rather than in the apparent separate steps, for example, as follows:

(5) 
$$2CaC_2 + 2MgCl_2 \rightarrow Mg_2C_3 + 2CaCl_2 + C$$

The two magnesium carbides, magnesium carbide ($MgC_2$) and magnesium sesquicarbide ($Mg_2C_3$) as set forth in Equations 1 and 2, seem to be formed preferentially in overlapping temperature ranges. Thus the magnesium carbide, $MgC_2$, is formed at temperatures within the approximate range of 400° C. to 600° C., as expressed by the first equation, and magnesium sesquicarbide is formed at temperatures of the range of 450° C. to 700° C., as expressed by the second equation. The magnesium sesquicarbide appears to be largely formed at a temperature of about 575–650° C. At temperatures above 700° C. reactions resulting in the formation of free magnesium occur.

At a temperature of between about 400° C. and 425° C. the start of an endothermic reaction was observed which appears to correspond to the reaction represented by Equation 1, hereinabove. At a temperature between 575–600° C., the start of an exothermic reaction was observed which appears to correspond to the formation of magnesium sesquicarbide according to the reaction of Equation 2. The strong evolution of heat in this reaction may cause the temperature of the reaction mass to rise above the decomposition temperature of the magnesium sesquicarbide, unless provision is made for removing heat. Heating of the reactants is maintained until the exothermic reaction occurs so as to insure formation of the magnesium sesquicarbide, but the temperature and time of heating are controlled so that the added heat of the exothermic reaction will not cause the maximum temperature to exceed 700° C. for any length of time which would cause any substantial decomposition of the magnesium sesquicarbide. This can be done, for example, by use of an external cooling means, or by passing an inert gas, such as helium or argon, through the reaction vessel at the start of the exothermic reaction. Temperatures of above about 700° C. for any substantial length of time are to be avoided since conversion of some of the magnesium carbides to free magnesium and carbon begins, accompanied by volatilization of the metal at such high temperatures.

The reaction between the solid calcium carbide and solid magnesium chloride is rendered more efficient by use of the solid material in finely divided form. In general, the smaller the particle size of the reactants the greater the surface area is in proportion to the weight of the material; and greater surface area insures more intimate contact between the particles to produce a high reaction efficiency. There may be provided a continuous grinding or agitation of the mixture during the reaction period which tends to prevent the formation of an agglomerate and promote intimate mixing of the reactants. For example, finely divided calcium carbide and finely divided magnesium chloride may be reacted at a temperature within the range of 500° C. to 700° C. in a closed vessel with continuous agitation or grinding provided therein, such as a heated ball mill.

It is to be understood that the reaction should be conducted in the substantial absence of any substances which would interfere therewith. Thus, for example, to obtain a magnesium sesquicarbide product which will give a maximum yield of methylacetylene, the magnesium chloride employed in the reaction should be substantially anhydrous and free of any basic magnesium chloride. The presence of any water, as vapor or liquid or water of crystallization, causes the calcium carbide to generate acetylene, as does the presence of any magnesium basic chloride MgCl(OH). Likewise, to obtain a magnesium sesquicarbide-containing product which generates optimum yields of methylacetylene, the atmosphere in which the reaction is carried out should also be substantially free of any substance which would interfere with the reaction. For example, it is preferred to exclude the constituents of air, such as nitrogen and oxygen, by either carrying out the reaction in a vacuum or in the presence of an inert gas, for example, argon or helium, or a mixture thereof. The presence of nitrogen and oxygen in any substantial amounts would adversely affect the yields. For example, calcium carbide when hot reacts with nitrogen to form calcium cyanamide and calcium cyanide, and with oxygen to form calcium oxide. Both carbides of magnesium ($MgC_2$ and $Mg_2C_3$) have been found to react when hot with oxygen to form the oxide and with nitrogen to form the nitride, cyanamide and cyanide of magnesium. Accordingly, it is preferred to carry out the reaction in the substantial absence of any substances which would interfere therewith. The term inert atmosphere as used hereinafter shall be construed to include both a vacuum and an atmosphere which is substantially free of any substance which would interefere with the reaction of this invention.

In general, the calcium carbide and magnesium chloride are employed in equimolecular proportions, although an excess of one or the other of the reactants may be used. Pure calcium carbide need not be employed. Ordinary commercial calcium carbide has been found highly satisfactory. The commercial calcium carbide usually contains about 77% calcium carbide and about 23% calcium oxide. Since, in the reaction, the magnesium chloride will also react with the calcium oxide present, the magnesium chloride is employed in such an amount as to provide a 1:1 molar ratio of magnesium chloride to the sum of the calcium carbide and calcium oxide. The magnesium chloride reacts with the calcium oxide at lower temperatures than does the magnesium chloride with the calcium carbide, and it is accordingly believed that the reaction of the calcium oxide with magnesium chloride goes to completion before any of the calcium carbide reacts with the magnesium chloride. The use of the additional magnesium chloride to react with the calcium oxide increases both the yield of the magnesium sesquicarbide as well as the methylacetylene resulting from the conversion of the latter.

The reaction between the calcium oxide and the magnesium chloride can be illustrated by the following equation:

(6) $\quad CaO + MgCl_2 \rightarrow MgO + CaCl_2$

The magnesium sesquicarbide product obtained by the process of this invention, when commercial calcium carbide is employed, includes magnesium sesquicarbide, calcium chloride, carbon, and magnesium oxide. The magnesium sesquicarbide present ranges from about 20–25%. There may also be present some unreacted magnesium chloride, calcium oxide, and calcium carbide as well as magnesium carbide ($MgC_2$) that may have formed but may not have been converted to $Mg_2C_3$ since, when the product is hydrolyzed, the resulting gas obtained also contains a minor amount of acetylene in addition to the methylacetylene. If pure calcium carbide is employed, calcium oxide is not present and magnesium oxide would not be formed. The magnesium sesquicarbide product is obtained substantially in the same form as the reactants. A partial sintering of the particles of reactants appears under microscopic examination but no fusion thereof or formation of a melt.

The following examples will serve to illustrate the invention. For simplicity, the details as to amounts of reactants, molar ratios, percentage yields of methylacetylene and times of reaction have been tabulated. In each of the examples the reaction was carried out in a covered crucible or furnace. A mixture of calcium carbide and anhydrous magnesium chloride in the amounts indicated was ground to about 100-mesh and placed in the furnace. In Example 1, the carbide employed contained about 87% of calcium carbide and about 13% of calcium oxide, while in Examples 2 and 3 commercial calcium carbide which contained about 77% of calcium carbide and about 23% of calcium oxide was employed. A stream of argon gas was passed continuously through the furnace to prevent contact between the reaction mixture and any air. The mixture of calcium carbide and magnesium chloride was then heated, by means of a gas burner, although any conventional heating means can be used. The duration of the reaction temperature above 600° C. is indicated in the table and ranged from 3 to 25 minutes. The magnesium sesquicarbide product obtained was hydrolyzed with water at room temperature and in each instance gave the per cent yield of methylacetylene indicated. These yields were determined on the basis of the calcium carbide of the original mix. The molar ratio in the fourth column is calculated on the basis that the $MgCl_2$ first reacts with the CaO.

*Table I*

| Example | $MgCl_2$, Grams | Calcium Carbide, Grams | Molar Ratio $MgCl_2$:$CaC_2$ | Percent Yield | Time |
|---|---|---|---|---|---|
| 1 | 159 | 100 | 1.05 | 84 | 25 |
| 2 | 162 | 100 | 1.06 | 90 | 3 |
| 3 | 162 | 100 | 1.06 | 67 | 5 |

In Example 2, as soon as the start of the abovementioned exothermic reaction was observed, a large flow of argon was passed through the reacting mass. As a result the temperature dropped below 600° C. in about three minutes. The maximum temperatures reached in Examples 2 and 3 were 660° C. and 690° C. respectively. In Example 1 the added heat of the exothermic reaction caused the temperature of the reaction mass to reach momentarily a maximum of 730° C. This temperature rise was of such short duration that little, if any, decomposition of the magnesium sesquicarbide was observed.

The process was also carried out in a cylindrical stainless steel shell 13 inches long and 8 inches in diameter, the details being tabulated in the examples set forth below. In each of the examples, a mixture of commercial calcium carbide (about 77% $CaC_2$ and about 23% CaO) and anhydrous magnesium chloride in the amounts indicated was ground to 100-mesh or smaller. Argon or helium gas blanketed the reaction mixture. In Examples 4, 5, 6, 7 and 8, the shell included about 300 stainless steel balls of ½ inch and 1 inch diameters, so that the reaction vessel served also as a ball mill. The rest of the examples were carried out without the steel balls, the shell itself serving as a closed end rotary kiln. The reaction temperature in all the examples was 625° C. except for Example 8, in which the temperature was 605° C.

Table II

| Example | MgCl₂, Grams | Calcium Carbide, Grams | Molar Ratio MgCl₂:CaC₂ | Percent Yield | Time |
|---|---|---|---|---|---|
| 4 | 650 | 400 | 1.08 | 77 | 30 |
| 5 | 650 | 400 | 1.08 | 80 | 30 |
| 6 | 650 | 400 | 1.08 | 76 | 30 |
| 7 | 650 | 400 | 1.08 | 66 | 5 |
| 8 | 650 | 400 | 1.08 | 76 | 30 |
| 9 | 650 | 300 | 1.56 | 89 | 30 |
| 10 | 650 | 400 | 1.08 | 81 | 30 |
| 11 | 650 | 400 | 1.08 | 60 | 30 |
| 12 | 650 | 400 | 1.08 | 79 | 15 |

In Examples 10 and 12, the mixtures of the ground anhydrous magnesium chloride and commercial calcium carbide were compressed into pellets or briquettes at room temperature, under a pressure of approximately 20,000 p. s. i. for about five minutes. The pellets were approximately 1 inch x ¾ inch in diameter and each weighed about 1 ounce. The reactants in pellet form have certain advantages, especially with regard to handling, during the various reactions. The magnesium sesquicarbide product was obtained in the form of pellets which exhibited intra-pellet sintering but no inter-pellet sintering. The pellet mixtures do not fuse together and adhere to the kiln walls, and are thus easily removed from the kiln. The magnesium sesquicarbide product obtained according to Examples 4 through 12, on hydrolysis with water at room temperature, gave the percentage yield of methylacetylene indicated. These yields were determined on the basis of the calcium carbide of the original mix.

In the above examples, the reaction time at above 600° C. did not exceed thirty minutes. When the reaction time was extended beyond thirty minutes it was found that the yields of methylacetylene were considerably less than the 60 to 90% yields obtained in the hereinabove examples. Thus, when the reaction time was one hour the yield of methylacetylene was 53% and when 3½ hours the yield was 25%. Reaction periods in excess of thirty minutes generally resulted in the formation of some free magnesium.

In the hydrolysis treatment, any unreacted calcium carbide and magnesium carbide would be converted to acetylene so that the latter would also be present in the gas generated. This can be separated from the methylacetylene by any of the usual methods, if desired.

Since the present invention uses an amount of magnesium chloride approximately equal to that of calcium carbide from a molar standpoint, it is a far more practical and efficient process when compared with the prior art process above-mentioned involving the use of a molten eutectic mixture of large amounts of magnesium chloride and sodium or potassium chloride with calcium carbide. The prior art process requires handling of large quantities of non-carbide salts such as magnesium chloride and sodium or potassium chloride during gas generation. According to the process of the present invention, however, the amount of magnesium chloride required is considerably reduced. Neither sodium chloride nor potassium chloride as fluxes are required. When the reaction of calcium carbide and a molten eutectic mixture of magnesium chloride and sodium chloride was conducted in an inert gas atmosphere and the resulting sesquicarbide product treated to generate methylacetylene, the yield of methylacetylene was only about 2%, in sharp contrast to the approximately 60% to 90% yield realized by the process and novel magnesium sesquicarbide-containing product comprising the instant invention.

While the specific embodiments of the invention have been described in connection with a batch type operation, it will be understood that equally good results may be obtained when the invention is carried out in a continuous operation. It will also be understood that the invention is not limited to the specific examples described herein, but may be practiced in other ways without departing from the spirit and scope of the invention as defined by the following claims.

We claim:

1. A process of producing a product containing magnesium sesquicarbide which comprises heating and reacting calcium carbide and substantially anhydrous magnesium chloride, said reactants being in finely-divided state and in intimate contact, carrying out the reaction in an inert atmosphere, and maintaining the reaction mixture at a temperature at least sufficient for the formation of magnesium sesquicarbide but below that which causes any substantial melting of the magnesium chloride and any substantial decomposition of the magnesium sesquicarbide whereby said calcium carbide and said magnesium chloride are reacted in a solid state.

2. A process in accordance with claim 1 wherein the reaction is carried out at a temperature of from about 575° C. to about 650° C.

3. A process in accordance with claim 1 wherein said temperature is maintained uniformly throughout the reaction mixture to obtain a non-fused, solid mixture in finely-divided form and containing magnesium sesquicarbide as one of the major reaction products.

4. A process in accordance with claim 1 in which the finely-divided particles of calcium carbide and magnesium chloride are not larger than 100-mesh.

5. A process in accordance with claim 1 in which the mol ratio of said magnesium chloride to said calcium carbide, CaC₂, is about 1 to 1.

6. A process in accordance with claim 1 wherein calcium carbide containing a minor amount of calcium oxide is employed and sufficient magnesium chloride to react with said calcium oxide and said calcium carbide.

7. A process in accordance with claim 1 wherein the magnesium sesquicarbide product formed is treated with an agent capable of generating methylacetylene therefrom.

8. A composition of matter which generates high yields of methylacetylene when subjected to hydrolysis or alcoholysis, said composition consisting essentially of a non-fused, solid mixture in finely-divided form and containing as one of the major reaction products magnesium sesquicarbide, and said composition having been produced in accordance with the process of claim 1.

References Cited in the file of this patent

UNITED STATES PATENTS

| | | |
|---|---|---|
| 681,096 | Blackmore | Aug. 20, 1901 |
| 2,380,008 | Abrams et al. | July 10, 1945 |
| 2,510,550 | Byrns | June 6, 1950 |

FOREIGN PATENTS

| | | |
|---|---|---|
| 670,524 | Germany | Jan. 20, 1930 |

OTHER REFERENCES

Fiat Final Report No. 1019, January 17, 1947, Office of Military Government for Germany (U. S.). Field Information Agency Technical (5 pages, 2 and 3 only needed). Technical Industrial Intelligence Division, U. S. Dept. of Commerce. "Magnesium Carbide and Methylacetylene," by Albert S. Carter.